United States Patent
Gweon et al.

(10) Patent No.: US 6,563,098 B2
(45) Date of Patent: May 13, 2003

(54) HIGH-PRECISION DISPLACEMENT MEASUREMENT DEVICE AND METHOD USING UNIT DISPLACEMENT SENSOR BASED ON CONFOCAL THEORY

(75) Inventors: Dae Gab Gweon, Taejon (KR); Jung Woo Seo, Taejon (KR)

(73) Assignee: Korea Advanced Institute of Technology, Taejon (KR)

( * ) Notice: Subject to any disclaimer, the term of this patent is extended or adjusted under 35 U.S.C. 154(b) by 115 days.

(21) Appl. No.: 09/900,220

(22) Filed: Jul. 6, 2001

(65) Prior Publication Data

US 2002/0088921 A1 Jul. 11, 2002

(30) Foreign Application Priority Data

Jan. 11, 2001 (KR) .......................................... 2001-1654

(51) Int. Cl.[7] ............................................. G02B 27/40
(52) U.S. Cl. ............................. 250/201.2; 250/201.5; 369/44.32
(58) Field of Search ......................... 250/201.3, 201.2, 250/201.4, 216, 234, 201.5, 559.29, 559.32, 559.38; 359/368, 388, 385, 389, 386; 356/609, 616, 624, 318; 369/44.23, 44.26, 44.32

(56) References Cited

U.S. PATENT DOCUMENTS

| | | | |
|---|---|---|---|
| 5,315,374 A | * | 5/1994 | Yoshizumi .................. 356/609 |
| 5,479,252 A | * | 12/1995 | Worster et al. ........... 356/237.5 |
| 5,483,055 A | | 1/1996 | Thompson et al. |
| 5,532,873 A | | 7/1996 | Dixon |
| 5,543,918 A | | 8/1996 | Abraham et al. |
| 5,587,832 A | | 12/1996 | Krause |
| 5,612,818 A | | 3/1997 | Kumagai et al. |
| 6,459,484 B1 | * | 10/2002 | Yokoi ......................... 356/318 |

* cited by examiner

*Primary Examiner*—Que T. Le
*Assistant Examiner*—Seung C. Sohn
(74) *Attorney, Agent, or Firm*—Christopher E. Blank, Esq.; Jaeckle Fleischmann & Mugel, LLP

(57) ABSTRACT

A high-precision displacement measurement device and linear or rotational displacement measurement method using a unit displacement sensor based on a confocal theory. This device is simpler in construction, lower in cost and superior in resolution to other displacement measurement devices, and is capable of measuring a much wider area than other measurement equipment. The present device is adapted to project a spot of light from a light source on an object whose displacement is to be measured and measure a relative displacement of the object from a displacement of the projected light spot. To this end, the unit displacement sensor includes a transmission lens for transmitting a divergent beam of light emitted from the light source through a slit or pinhole with a certain size, a collimating lens for collimating the light beam transmitted through the slit or pinhole, an object lens arranged between the collimating lens and the object, a beam splitter for splitting a beam of light, reflected from the object to the transmission lens, according to a wavelength, and a photodetector for detecting a light intensity of the light beam split by the beam splitter. A piezoelectric actuator is provided to finely move the unit displacement sensor so as to always maintain optical signals detected by the photodetector at the maximum intensity.

6 Claims, 5 Drawing Sheets

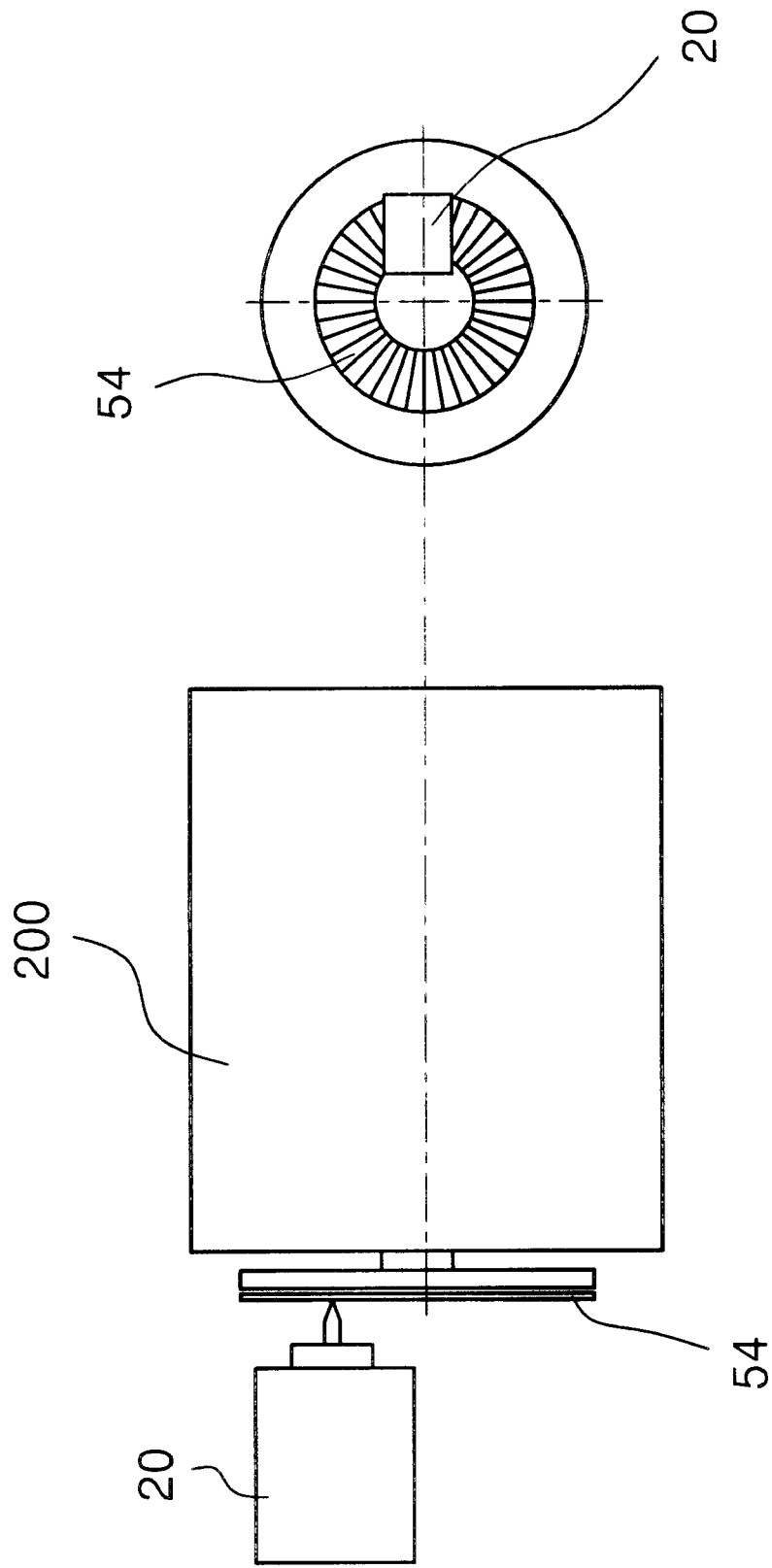

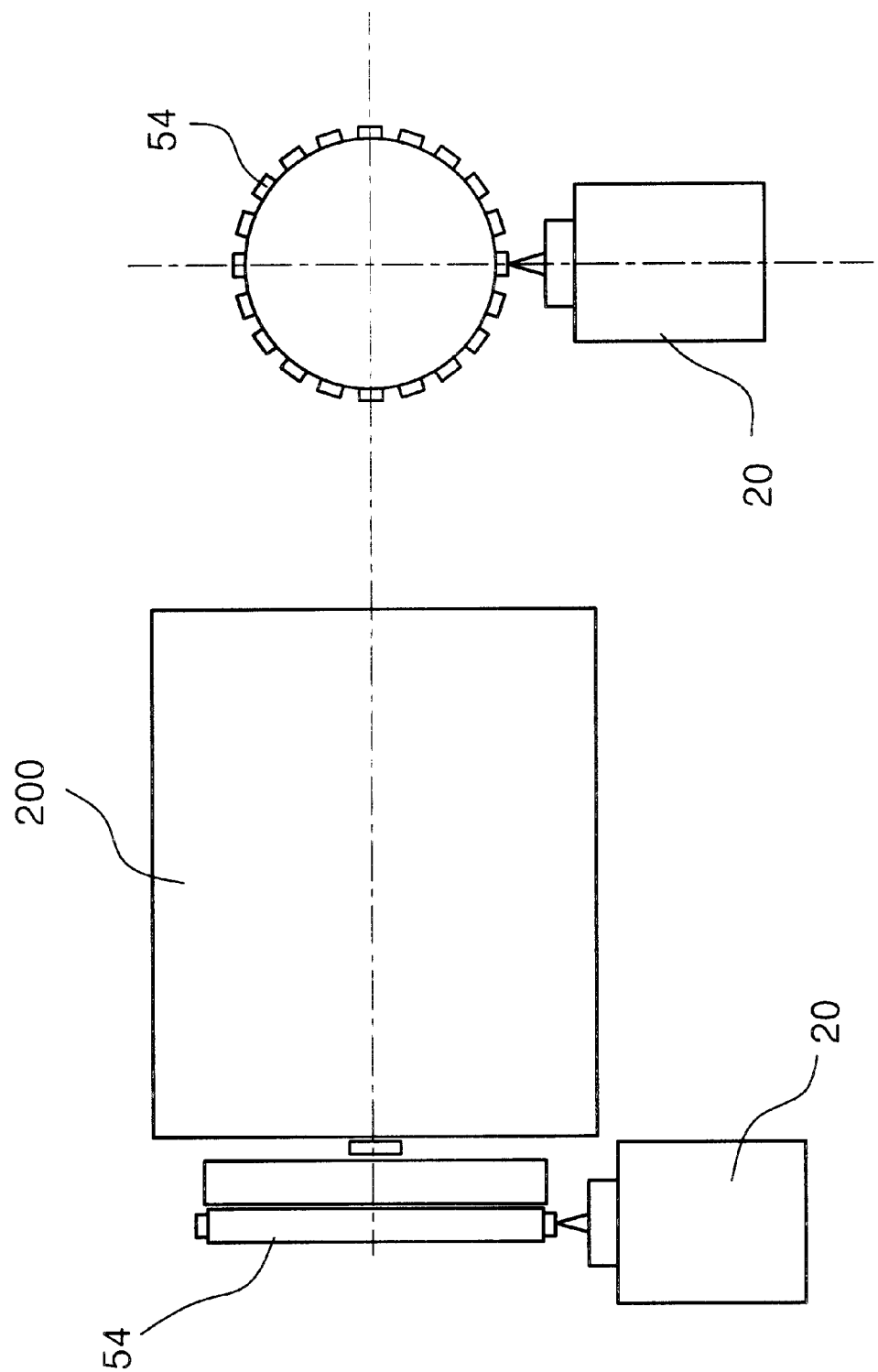

HIGH-PRECISION DISPLACEMENT MEASUREMENT DEVICE AND METHOD USING UNIT DISPLACEMENT SENSOR BASED ON CONFOCAL THEORY

CROSS-REFERENCE TO RELATED APPLICATIONS

This application claims the benefit of Korean Patent Application Serial No. 2001-1654, filed Jan. 11, 2001.

BACKGROUND OF THE INVENTION

1. Field of the Invention

The present invention relates in general to a measurement device for measuring the displacement of a target (object to be measured) at a high degree of positioning precision, for example, several ten nanometers, and more particularly to a high-precision displacement measurement device using a unit displacement sensor based on a confocal theory, which is simpler in construction, lower in cost and superior in resolution to other displacement measurement devices, and is capable of measuring a much wider area than other measurement equipment.

Further, the present invention relates to a displacement measurement method for measuring a linear or rotational displacement using a unit displacement sensor based on a confocal theory.

Therefore, this invention can be used as a measurement sensor for a high-precision positioning mechanism such as equipment for feeding and aligning wafers in a semiconductor lithographic process. Other than this, the present invention can be used as a sensor for high-precision positioning control of machine tools, feeding devices for optical precision equipment, high-density storage media, etc.

Further, the present invention relates to a device capable of replacing optical interferometers or capacitive displacement measurement devices used for high-precision displacement measurements.

2. Description of the Prior Art

A capacitive displacement measurement device is one of conventional displacement measurement devices. This displacement measurement device is a high-precision displacement sensor using variations in the flow of charges with variations in inter-plate interval. This device is so very precise that the amount of noise in a circuitry can be directly connected with a positioning resolution, but it is disadvantageous in that it can perform a measuring operation only within the range of a short distance and is high in cost due to a high sensitivity to vibrations.

Another conventional displacement measurement device is an encoder using an optical disk, which is a sensor for measuring a rotational displacement of a target. This encoder is adapted to obtain the amount of rotation on the basis of the number of beams of light transmitted through holes arranged at regular intervals in a circumferential direction of the optical disk, as in most encoders. This encoder is limited in rotational displacement measurement resolution because this resolution is determined according to the number of holes provided in the optical disk.

Another conventional displacement measurement device is an optical grating sensor, which is a displacement sensor using a diffraction of a beam of light through a grating depending on optical conditions such as a beam wavelength, grating interval, angle of incidence, etc. The optical grating sensor is adapted to obtain a linear displacement of the grating using variations in angle of the diffracted light beam with variations in the grating interval among such optical conditions. However, the optical grating sensor is disadvantageous in that gratings having different intervals must be precisely fabricated, and the diffracted beam of light has a high sensitivity to the diffraction conditions and a great nonlinearity in light amount. In other words, the measurement of a relative displacement between the optical system and the grating requires a very accurate setup and is not excellent in position detection resolution.

SUMMARY OF THE INVENTION

Therefore, the present invention has been made in view of the above problems, and it is an object of the present invention to provide a high-precision displacement measurement device using a unit displacement sensor based on a confocal theory, which is simpler in construction, lower in cost and superior in resolution to other displacement measurement devices, and is capable of measuring a much wider area than other measurement equipment.

It is another object of the present invention to provide a displacement measurement method for measuring a linear or rotational displacement using a unit displacement sensor based on a confocal theory.

In accordance with one aspect of the present invention, the above and other objects can be accomplished by the provision of a high-precision displacement measurement device for projecting a spot of light from a light source on an object whose displacement is to be measured and measuring a relative displacement of the object from a displacement of the projected light spot, the device comprising a unit displacement sensor based on a confocal theory, the unit displacement sensor including a transmission lens for transmitting a divergent beam of light emitted from the light source through a slit or pinhole with a certain size, a collimating lens for collimating the light beam transmitted through the slit or pinhole, an object lens arranged between the collimating lens and the object, a beam splitter for splitting a beam of light, reflected from the object to the transmission lens, according to a wavelength, and a photodetector for detecting a light intensity of the light beam split by the beam splitter; and actuation means for finely moving the unit displacement sensor to always maintain optical signals detected by the photodetector at the maximum intensity.

Preferably, the actuation means may be a piezoelectric actuator attached to the unit displacement sensor.

Further, an integrated unit of a laser diode and photodiode may replace the light source, beam splitter and photodetector.

In accordance with another aspect of the present invention, there is provided a short-distance displacement measurement method using a unit displacement sensor based on a confocal theory, which projects a spot of light from a light source on an object whose displacement is to be measured and measures a relative displacement of the object from a displacement of the projected light spot, the method comprising the steps of a) by a transmission lens, transmitting a divergent beam of light emitted from the light source through a slit or pinhole with a certain size; b) by a collimating lens, collimating the light beam transmitted through the slit or pinhole; c) by an object lens, projecting the light beam collimated by the collimating lens on the object; d) by a beam splitter, splitting a beam of light, reflected from the object to the transmission lens, according to a wavelength; e) by a photodetector, detecting a light intensity of the light beam split by the beam splitter; and f) detecting a displacement of actuation means minutely moving relatively while tracing a fine movement of the object, thereby always maintaining optical signals detected by the photodetector at the maximum intensity.

In accordance with a further aspect of the present invention, there is provided a long-distance linear displacement measurement method using a unit displacement sensor based on a confocal theory, comprising the step of attaching a linear grating of a known shape to a long-distance object whose rotational displacement is to be measured, linearly moving the unit displacement sensor in close proximity to the linear grating and measuring a linear displacement of the long-distance object from successive optical signals of the same response frequency detected by the unit displacement sensor.

In accordance with yet another aspect of the present invention, there is provided a rotational displacement measurement method using a unit displacement sensor based on a confocal theory, comprising the step of attaching a circumferential grating of a known shape to an object whose rotational displacement is to be measured, in a circumferential direction of the object or forming the grating directly in the object in the circumferential direction of the object, moving the unit displacement sensor in close proximity to the circumferential grating and measuring a rotational displacement of the object from successive optical signals of the same response frequency detected by the unit displacement sensor.

BRIEF DESCRIPTION OF THE DRAWINGS

The above and other objects, features and advantages of the present invention will be more clearly understood from the following detailed description taken in conjunction with the accompanying drawings, in which:

FIGS. 3 and 4 are schematic views of rotational displacement measurement methods using a circumferential grating disk in accordance with a third embodiment of the present invention.

DETAILED DESCRIPTION OF THE PREFERRED EMBODIMENTS

The present invention is based on a confocal theory, which is an optical theory capable of obtaining information of a target (object to be measured) by restoring a correlation between a focal point on the target and a focal point on a detector.

The preferred embodiments of this invention will hereinafter be described in detail with reference to the accompanying drawings.

Figure 1:
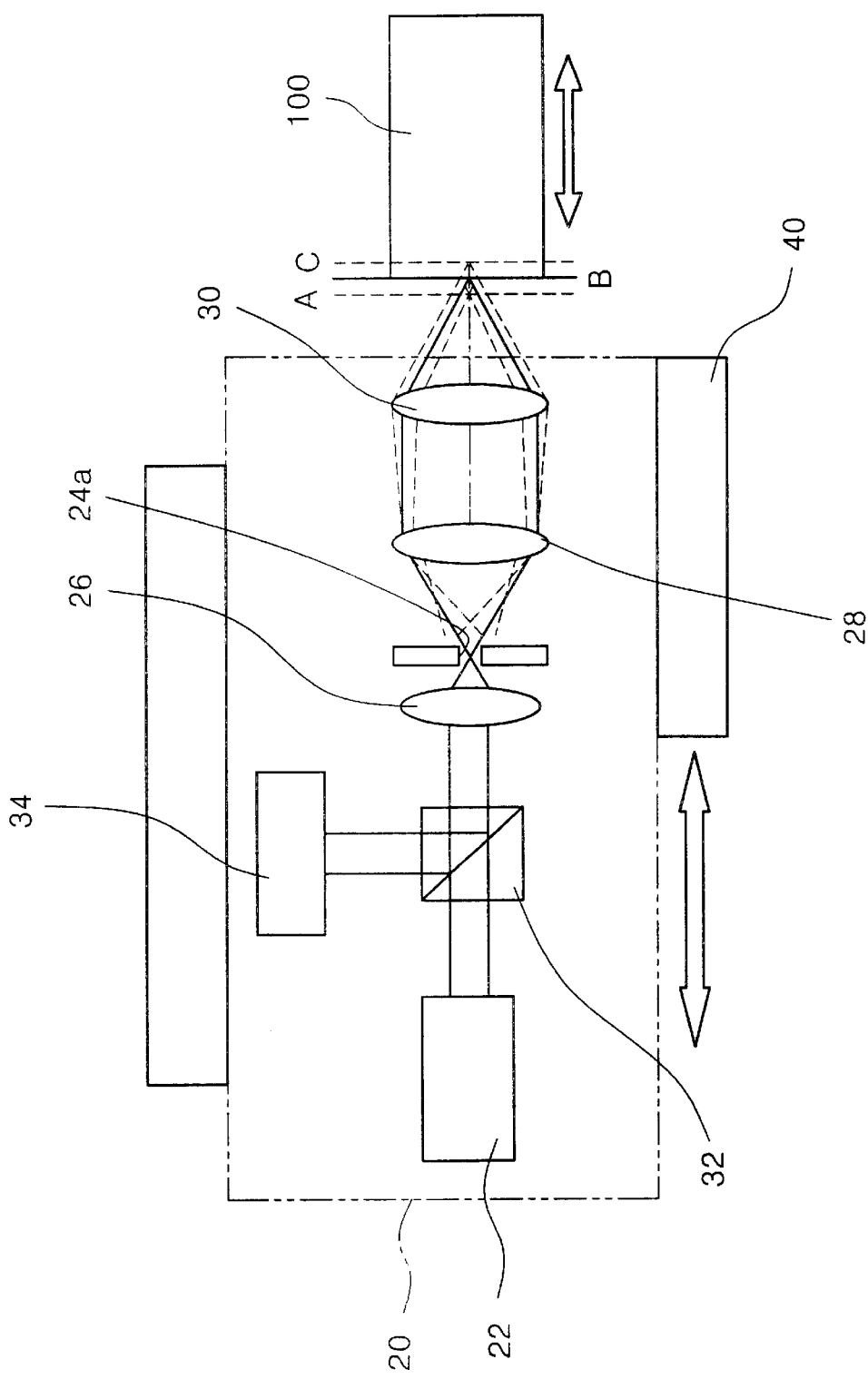
FIG. 1 is a schematic view of a short-distance displacement measurement device using a short-distance displacement sensor in accordance with a first embodiment of the present invention.

FIG. 1 shows the construction of a short-distance displacement measurement device using a short-distance displacement sensor in accordance with a first embodiment of the present invention.

In this drawing, the reference numeral 20 denotes a unit displacement sensor and the reference numeral 40 denotes a piezoelectric actuator for finely actuating the unit displacement sensor 20.

The unit displacement sensor 20 includes a light source 22, a transmission lens 26 for transmitting a divergent beam of light emitted from the light source 22 through a slit (or pinhole) 24a with a certain size, a collimating lens 28 for collimating the light beam transmitted through the slit 24a, an object lens 30 arranged between the collimating lens 28 and an object 100 whose displacement is to be measured, a beam splitter 32 for splitting a beam of light, reflected from the object 100 to the transmission lens 26, according to a wavelength, and a photodetector 34 for detecting a light intensity of the light beam split by the beam splitter 32.

That is, in the unit displacement sensor 20, the light source 22 emits a divergent beam of light, which is then transmitted to the collimating lens 28 through the transmission lens 26 and slit 24a. The collimating lens 28 collimates the light beam transmitted through the slit 24a, while adjusting the diameter of the collimated light beam. This collimated beam of light is focused on the object 100 through the object lens 30.

A beam of light reflected from the object 100 is split by the beam splitter 32, condensed by the transmission lens 26 and received by the photodetector 34, which then detects a light intensity of the received light beam.

In the case where the light beam has been accurately focused on the slit 24a and a focal plane B on the object 100, the maximum amount of light is present before the opening of the slit 24a. In other cases, light beams go out of focus and are then rapidly dissipated.

When the object 100 has a relative displacement in a light emission direction, or perpendicularly to its focal plane, the same maximum amount of light can be obtained by driving the short-distance displacement sensor 20 in the same direction.

Accordingly, the piezoelectric actuator 40 acts to actuate the short-distance displacement sensor 20 to always maintain detected optical signals at the maximum intensity. At this time, the displacement of the piezoelectric actuator 40 is extracted and the displacement of the object 100 can be very precisely measured on the basis of the extracted displacement of the piezoelectric actuator 40.

The piezoelectric actuator 40 has a relatively simple structure, and the displacement of the actuator 40 in the measurement direction of the object 100 can be detected at a high resolution of a nanometer level.

This high-resolution displacement detection shows the excellent performance of the optical axial short-distance displacement sensor 20 to detect a displacement of several nanometers at a remarkable speed and low cost. Namely, the sensitivity to a focuswise displacement of a general optical system can be maximized by using the diameter of the slit 24a or other pinhole.

On the other hand, an integrated unit of a laser diode and photodiode may replace the light source 22, photodetector 34 and beam splitter 32, thereby making the light transmission/reception structure very simple.

Figure 2A:
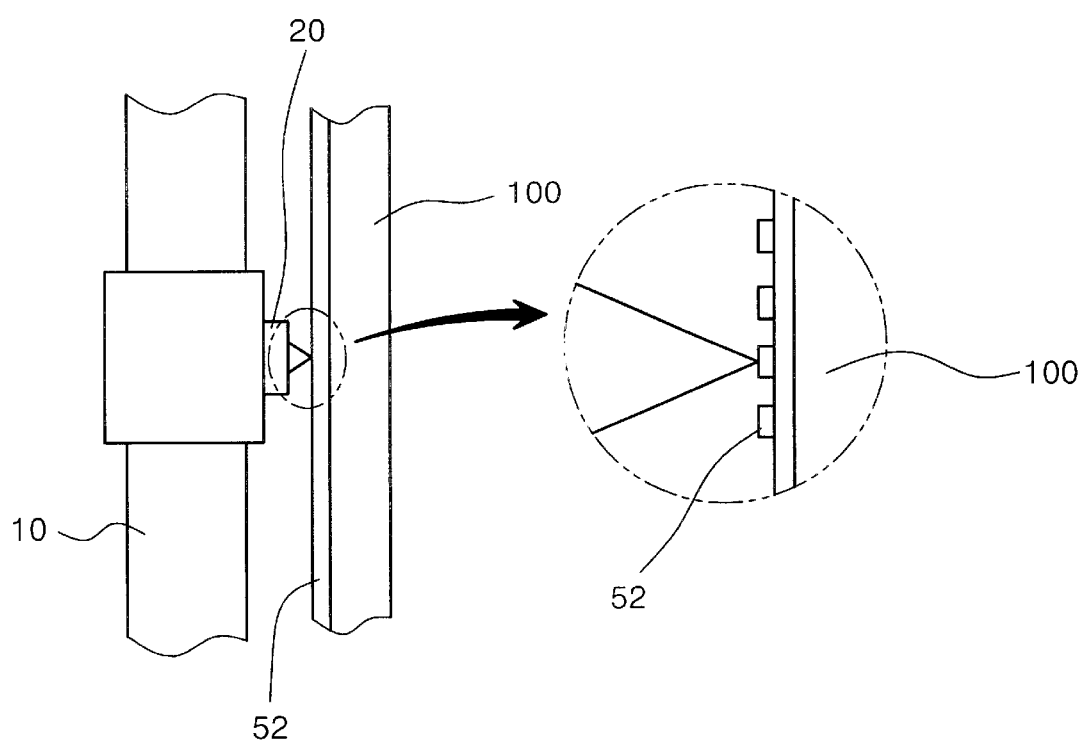
FIG. 2a is a schematic view of a long-distance linear displacement measurement method in accordance with a second embodiment of the present invention.
Figure 2B:
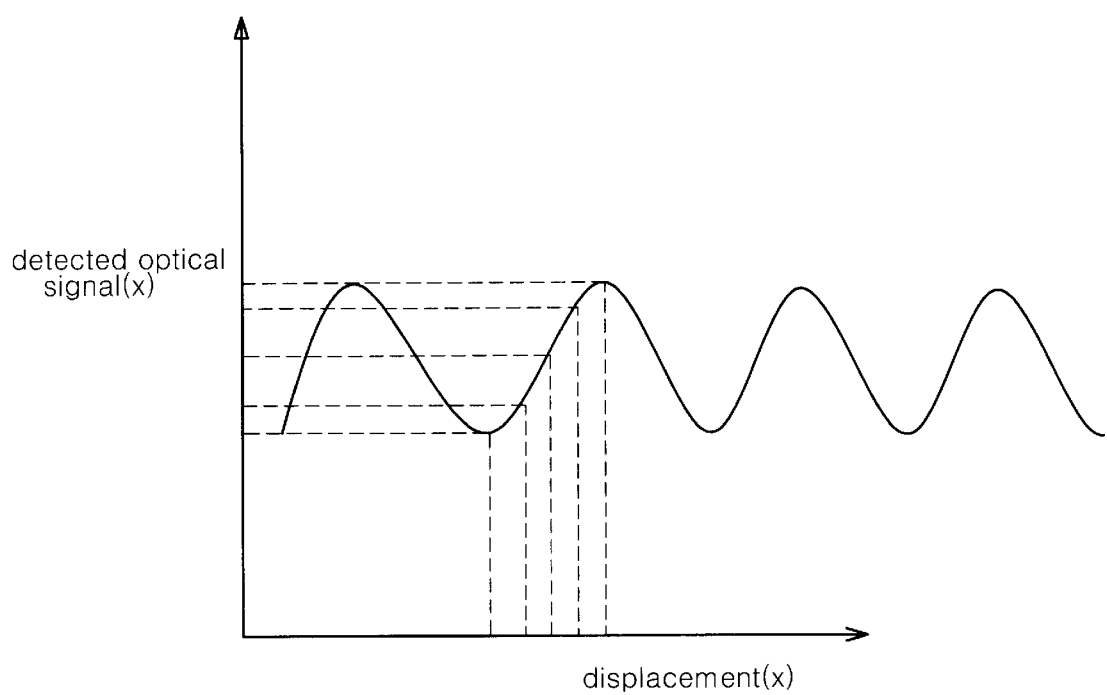
FIG. 2b is a waveform diagram of optical signals detected depending on a distance displacement in accordance with the second embodiment of the present invention.

FIG. 2a is a schematic view of a long-distance linear displacement measurement method in accordance with a second embodiment of the present invention and FIG. 2b is a waveform diagram of optical signals detected depending on a distance displacement in accordance with the second embodiment of the present invention.

In the second embodiment, a linear grating 52 is attached to the object 100 whose displacement is to be measured. A relative perpendicular displacement between the object 100 and the grating 52 is measured, and the displacement of the object 100 can be highly precisely measured on the basis of the measured relative perpendicular displacement.

In other words, the grating 52 of a known shape is attached to the short-distance displacement sensor 20 of the first embodiment. As the object 100 moves along a linear movement guide 10 in the perpendicular direction where the short-distance displacement sensor 20 is attached thereto, optical signals are detected in the form of successive and repetitive waves. The displacement of the object 100 can be measured at a resolution corresponding to a grating period by counting the number of poles of the detected optical signals. As an alternative, a resolution shorter than the grating period may be derived from an interpolation between poles of the detected optical signals. Therefore, the present method can realize a higher resolution than other high-precision displacement sensors.

FIGS. 3 and 4 are schematic views of rotational displacement measurement methods using a circumferential grating disk 54 in accordance with a third embodiment of the present invention, wherein the circumferential grating disk 54 is attached to a rotating body 200 for measurement of a rotational displacement thereof.

In FIG. 3, the circumferential grating disk 54 is attached to the front surface of the rotating body 200 and, in turn, the short-distance displacement sensor 20 is positioned in the front of the disk 54 to count the number of poles of repetitively detected optical signals, as shown in FIG. 2b, so as to measure a rotational displacement of the rotating body 200 on the basis of the counted number.

That is, optical signals of the same response frequency are successively detected with rotation of the circumferential grating disk 54 with grating marks being known in shape and interval. A rotational displacement of the rotating body 200 can be measured from the successive optical signals on a grating interval basis. Because the grating marks are uniform in shape, an interpolation can be sufficiently performed, thereby enabling the implementation of a high-precision rotational displacement sensor.

In FIG. 4, the circumferential grating disk 54 is attached to a circumferential surface of the rotating body 200 or a grating is formed directly in the rotating body 200, thereby allowing the short-distance displacement sensor 20 to detect a rotational displacement of the body 200.

As apparent from the above description, the present invention provides a high-precision displacement measurement device and method which can measure a short-distance displacement, long-distance displacement and rotational displacement using a short-distance displacement sensor based on an optical theory capable of obtaining information of a target (object to be measured) by restoring a correlation between a focal point on the target and a focal point on a detector.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-precision displacement measurement device for projecting a spot of light from a light source on an object whose displacement is to be measured and measuring a relative displacement of the object from a displacement of the projected light spot, said device comprising:

a unit displacement sensor based on a confocal theory, said unit displacement sensor including a transmission lens for transmitting a divergent beam of light emitted from said light source through a slit or pinhole with a certain size, a collimating lens for collimating said light beam transmitted through said slit or pinhole, an object lens arranged between said collimating lens and said object, a beam splitter for splitting a beam of light, reflected from said object to said transmission lens, according to a wavelength, and a photodetector for detecting a light intensity of said light beam split by said beam splitter; and actuation means for finely moving said unit displacement sensor to always maintain optical signals detected by said photodetector at the maximum intensity.

2. The high-precision displacement measurement device as set forth in claim 1, wherein said actuation means includes a piezoelectric actuator attached to said unit displacement sensor.

3. The high-precision displacement measurement device as set forth in claim 1, wherein said device comprises an integrated unit of a laser diode and photodiode replacing said light source, beam splitter and photodetector.

4. A short-distance displacement measurement method using a unit displacement sensor based on a confocal theory, which projects a spot of light from a light source on an object whose displacement is to be measured and measures a relative displacement of the object from a displacement of the projected light spot, said method comprising the steps of:

a) by a transmission lens, transmitting a divergent beam of light emitted from said light source through a slit or pinhole with a certain size;

b) by a collimating lens, collimating said light beam transmitted through said slit or pinhole;

c) by an object lens, projecting said light beam collimated by said collimating lens on said object;

d) by a beam splitter, splitting a beam of light, reflected from said object to said transmission lens, according to a wavelength;

e) by a photodetector, detecting a light intensity of said light beam split by said beam splitter; and f) detecting a displacement of actuation means minutely moving relatively while tracing a fine movement of said object, thereby always maintaining optical signals detected by said photodetector at the maximum intensity.

5. A long-distance linear displacement measurement method using a unit displacement sensor of claim 1 based on a confocal theory, comprising the step of attaching a linear grating of a known shape to a long-distance object whose displacement is to be measured, linearly moving said unit displacement sensor in close proximity to said linear grating and measuring a linear displacement of said long-distance object from successive optical signals of the same response frequency detected by said unit displacement sensor.

6. A rotational displacement measurement method using a unit displacement sensor of claim 1 based on a confocal theory, comprising the step of attaching a circumferential grating of a known shape to an object whose rotational displacement is to be measured, in a circumferential direction of the object or forming said grating directly in said object in the circumferential direction of said object, moving said unit displacement sensor in close proximity to said circumferential grating and measuring a rotational displacement of said object from successive optical signals of the same response frequency detected by said unit displacement sensor.

* * * * *